US006180740B1

(12) United States Patent
Fitzgerald

(10) Patent No.: US 6,180,740 B1
(45) Date of Patent: Jan. 30, 2001

(54) STABILIZATION OF FLUOROCHEMICAL COPOLYMER EMULSIONS

(75) Inventor: John J. Fitzgerald, Newark, DE (US)

(73) Assignee: E. I. du Pont de Nemours and Company, Wilmington, DE (US)

( * ) Notice: Under 35 U.S.C. 154(b), the term of this patent shall be extended for 0 days.

(21) Appl. No.: 09/244,712

(22) Filed: Feb. 4, 1999

Related U.S. Application Data

(60) Provisional application No. 60/076,206, filed on Feb. 27, 1998.

(51) Int. Cl.[7] .................. C08F 118/00; C08F 120/22; C08F 18/20; C08F 20/22; C08F 218/00; C08F 220/22
(52) U.S. Cl. ........................... 526/245; 524/544
(58) Field of Search .................. 524/544; 526/245

(56) References Cited

U.S. PATENT DOCUMENTS

| | | | |
|---|---|---|---|
| 3,282,905 | * 11/1966 | Fasick et al. | 260/89.5 |
| 4,239,631 | 12/1980 | Brown | 252/8.75 |
| 4,472,286 | 9/1984 | Falk | 252/3 |
| 4,595,518 | 6/1986 | Raynolds et al. | 252/8.6 |
| 4,742,140 | 5/1988 | Greenwood et al. | 526/245 |
| 5,143,991 | 9/1992 | Amimoto et al. | 526/245 |
| 5,298,193 | 3/1994 | Klinger et al. | 252/355 |
| 5,360,581 | 11/1994 | Rizvi et al. | 252/544 |
| 5,415,986 | 5/1995 | Fujita et al. | 430/523 |

FOREIGN PATENT DOCUMENTS

| | | | |
|---|---|---|---|
| 283027 | 10/1990 | (DE) . | |
| 0 572 269 A1 | 12/1993 | (EP) | D06M/15/277 |
| 0 627 216 A2 | 12/1994 | (EP) . | |
| 52-012125 | 1/1977 | (JP) . | |
| 52-042477 | 4/1977 | (JP) . | |
| 55-080499 | 6/1980 | (JP) . | |
| 57-034873 | 2/1982 | (JP) . | |
| 63-081177 | 9/1986 | (JP) . | |
| 63-222767 | 3/1987 | (JP) . | |
| 3-243685 | 10/1991 | (JP) . | |
| 07034097 | 2/1995 | (JP) . | |
| 07041416 | 2/1995 | (JP) . | |
| 6-287548A | 5/1997 | (JP) . | |
| 9-118877 | 5/1997 | (JP) . | |
| 9-125051 | 5/1997 | (JP) . | |

\* cited by examiner

Primary Examiner—James J. Seidleck
Assistant Examiner—U. K. Rajguru

(57) ABSTRACT

This invention relates to a composition and process for preparing an aqueous emulsion composition of a fluorochemical copolymer for imparting oil and water repellency to textiles, the copolymer comprising perfluoroalkyl acrylates or (meth)acrylates; vinylidene chloride; and alkyl acrylates or (meth)acrylates; wherein the resulting emulsion has improved stability under conditions of high alkalinity, a highly anionic environment or high shear.

12 Claims, No Drawings

STABILIZATION OF FLUOROCHEMICAL COPOLYMER EMULSIONS

This application claims benefit of Provisional Application Ser. No. 60/076,206, filed Feb. 27, 1998.

FIELD OF THE INVENTION

This invention relates to a composition and process for preparing an aqueous emulsion composition of a fluorochemical copolymer for imparting oil and water repellency to textiles, the copolymer comprising perfluoroalkyl (meth) acrylates, vinylidene chloride and alkyl (meth)acrylates, wherein the resulting emulsion has improved stability under conditions of high alkalinity, a highly anionic environment, or high shear. (In all instances herein, the term "(meth) acrylate" is used to denote either acrylate or methacrylate).

BACKGROUND OF THE INVENTION

Fluoropolymer compositions are known having utility as textile treating agents. These fluoropolymers generally contain pendent perfluoroalkyl groups of three or more carbon atoms, which provide oil- and water-repellency when the compositions are applied to fabric surfaces. The perfluoroalkyl groups are generally attached by various connecting groups to polymeric groups not containing fluorine which form the backbone polymer chains of the resulting copolymer. These backbone polymers may be (meth)acrylates, vinyl, vinylidene or other groups. They may act to extend the performance of the more expensive perfluoroalkyl groups, act as bonding agents to fix the copolymer to the fabric, or may serve other functions.

Generally, such copolymers are prepared in an aqueous emulsion stabilized with a cationic, nonionic or anionic surfactant. While it is not unusual for a nonionic surfactant to be used in combination with a cationic or anionic surfactant, a cationic and anionic surfactant are not combined as emulsion stabilizers because of their potential reactions with each other. However, some uses of combined cationic and anionic surfactants have been disclosed to obtain certain end-product characteristics in cosmetic, photographic and other non-textile applications.

While fluoropolymer-(meth)acrylate compositions disclosed in the prior art may be satisfactory under certain application conditions, their aqueous emulsions are not sufficiently stable under some harsh conditions. For example, under a highly anionic and/or high alkalinity environment, such as produced by the strong alkali remaining on a fabric after mercerization, the emulsion from prior art compositions will turn dark and precipitate within a few hours. In other applications, where the fluoropolymer emulsion is subjected to high shear conditions or high temperatures, the emulsion may also destabilize, resulting in precipitation of the polymer from the dispersion. Such failures can be extremely costly. Compositions and processes for preparing fabric treatment agents having improved stability under these conditions are of significant interest to the textile and apparel industries. The present invention provides such compositions and processes.

SUMMARY OF THE INVENTION

The present invention comprises a process for preparing an oil- and water-repellent aqueous emulsion composition comprising:

1) forming a mixture with water comprising:
   (a) from about 50% to about 85% by weight on a water free basis of polymer chain units derived from a mixture of perfluoroalkylethyl acrylate monomers of the formula:

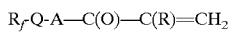

wherein
   $R_f$ is a straight or branched-chain perfluoroalkyl group containing from 2 to 20 carbon atoms,
   R is H or $CH_3$,
   A is O, S, or N(R'),
   Q is alkylene of 1 to 15 carbon atoms, hydroxyalkylene of 3 to 15 carbon atoms, —$(C_nH_{2n})(OC_qH_{2q})$m—, —$SO_2$—NR'($C_nH_{2n}$)—, or —CONR'($C_nH_{2n}$)—,
   R' is H or alkyl of 1 to 4 carbon atoms, n is 1 to 15, q is 2 to 4, and m is 1 to 15;
   (b) from about 1% to about 9.9% by weight on a water free basis of monomer chain units derived from vinylidene chloride; and,
   (c) from about 10% to about 25% by weight on a water free basis of monomer chain units derived from an alkyl (meth)acrylate having an alkyl chain length of 2 to 18 carbons;
   (d) from about 0.25% to about 5% by weight on a water free basis of cationic surfactant;
2) polymerizing said mixture, and
3) adding an anionic surfactant in an amount sufficient to yield an emulsion with a zeta potential of between +15 and +30 millivolts. Preferably the zeta potential is between +15 to +25 millivolts. More preferably the zeta potential is between +20 and +25 millivolts. Optionally, a nonionic surfactant is used with either surfactant.

In another embodiment of this invention, the above composition comprising (a), (b) and (c) is emulsified in water with from about 5% to about 15% by weight on a water free basis of anionic surfactant, the mixture is polymerized, and a cationic surfactant is added after polymerization to obtain an emulsion with the range of zeta potential between +15 and +30 millivolts. Optionally, a nonionic surfactant is used with either surfactant.

In still another embodiment, this invention comprises an oil- and water-repellent aqueous emulsion composition comprising by weight (water-free basis):

(a) from about 50% to about 85% polymer chain units derived from a mixture of perfluoroalkylethyl acrylate monomers of the formula:

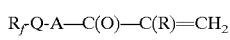

wherein
$R_f$ is a straight or branched-chain perfluoroalkyl group containing from 2 to 20 carbon atoms,
R is H or $CH_3$,
A is O, S, or N(R'),
Q is alkylene of 1 to 15 carbon atoms, hydroxyalkylene of 3 to 15 carbon atoms, —$(C_nH_{2n})(OC_qH_{2q})_m$—, —$SO_2$—NR'($C_nH_{2n}$)—, or —CONR'($C_nH_{2n}$)—,
R' is H or alkyl of 1 to 4 carbon atoms,
n is 1 to 15, q is 2 to 4, and m is 1 to 15;
(b) from about 1% to about 9.9% polymer chain units derived from vinylidene chloride;
(c) from about 10% to about 25% polymer chain units derived from an alkyl (meth)acrylate having an alkyl chain length of 2 to 18 carbons;
(d) a cationic surfactant and,
(e) an anionic surfactant,
said composition having the range of zeta potential of between +15 and +30 millivolts. Optionally a nonionic surfactant is used with either surfactant.

DETAILED DESCRIPTION OF THE INVENTION

The present invention provides a process for preparation of an aqueous emulsion of a copolymer composition providing oil- and water-repellency to textiles and other substrates, said composition having stability under conditions of high alkalinity, high anionic concentration, and/or high shear conditions. By high alkalinity is typically meant a pH of between 8 and 12. By high anionic concentration is meant any anionic concentration that interferes with the application, which will vary with the particular application and fabric. By high shear conditions is meant the conditions arising from operations such as pumping or unusually vigorous agitation.

This invention depends in part on the discovery that, after using a cationic surfactant to create a polymer emulsion, emulsions with unusual stability to harsh conditions are made by then adding a small amount of an anionic surfactant to achieve a particular zeta potential. This latter step enables a precise control of the zeta potential, as well as the ability to make emulsions with controllable positive, negative and even zero zeta potentials not readily available by prior art methods. Similarly, it was discovered that an emulsion with a controllable zeta potential is created using an anionic surfactant to create a stable polymer emulsion, and then adding a measured amount of a cationic surfactant. Optionally, a nonionic surfactant is used in combination with either the cationic or anionic surfactant. Unexpectedly, emulsions prepared by this process have unusual stability under harsh conditions such as high alkalinity, a highly anionic environment or high shear.

While this method is used to create emulsions of unusual stability having either positive or negative zeta potentials by controlling the relative amounts of cationic and anionic surfactants, all such emulsions may not be suitable for all applications because a certain zeta potential may be needed for affinity to the substrate employed or for specific reaction conditions. The zeta potential needed for a particular application is generally known by those carrying out the application, or is easily determined by experiment.

Emulsions with a positive zeta potential are desirable for applications where the emulsion is used to apply a coating to textile fabrics, which are typically anionic in character. The following aqueous emulsion composition of a fluorochemical copolymer, said emulsion having a positive zeta potential, is useful for imparting oil and water repellency to textiles.

The monomer mixture used for preparing the emulsion of the present invention is comprised of (a) from about 50% to about 85% by weight of a perfluoroalkylethyl acrylate (b), from about 1% to about 9.9% by weight of vinylidene chloride, and (c) from about 10% to about 25% by weight of an alkyl (meth)acrylate, wherein these monomers have the compositions defined below. These weight percents are on a water free basis. Preferably the monomer mixture contains from about 60% to about 85% by weight of (a), from about 2% to about 9% by weight of (b), and from about 15% to about 25% by weight of (c). More preferably the monomer mixture contains from about 60% to about 80% by weight of (a), from about 4% to about 8% by weight of (b), and from about 15% to about 22% by weight of (c).

The perfluoroalkylethyl acrylate monomers (a) of this invention have the formula:

wherein $R_f$ is a straight or branched-chain perfluoroalkyl group containing from 2 to 20 carbon atoms, R is H or $CH_3$, A is O, S, or N(R'), Q is alkylene of 1 to 15 carbon atoms, hydroxyalkylene of 3 to 15 carbon atoms, $-(C_nH_{2n})(OC_qH_{2q})_m-$, $-SO_2-NR'(C_nH_{2n})-$, or $-CONR'(C_nH_{2n})-$, R' is H or alkyl of 1 to 4 carbon atoms, n is 1 to 15, q is 2 to 4, and m is 1 to 15.

Preferably the above perfluoroalkylethacrylate monomers are between 60% and 85%, more preferably between 60% and 80% of the weight of the copolymer composition for optimum repellency performance. Still more preferably, the above perfluoroalkylethyl acrylate monomers have the formula

and consists essentially of:

(1) 0–10% monomer wherein k is 4 or less;

(2) 45–75% monomer wherein k is 6;

(3) 20–40% monomer wherein k is 8;

(4) 1–20% monomer wherein k is 10; and (5) 0–5% monomer wherein k is 12.

The monomer mixture used to prepare the emulsion of this invention also contains between 1 and 9.9% by weight of monomer chain units derived from vinylidene chloride for optimum performance. Amounts above 9.9% give a product with inadequate stability under harsh conditions. Preferably the amount is between 2% and 9%, more preferably between 4% and 8% by weight of monomer chain units.

The monomer mixture used to prepare the emulsion of this invention also contains monomer chain units derived from an alkyl (meth)acrylate having an alkyl chain length of 2 to 18 carbons. The amount of this alkyl (meth)acrylate is between 10% and 25% of the weight of the copolymer composition for optimum performance. Preferably the amount is between 15% and 25%, more preferably between 15% and 22%. Preferably the chain length is between 12 and 18 carbons. Most preferably the alkyl (meth)acrylate is stearyl methacrylate.

The monomer mixture of (a), (b) and (c) is mixed in water. The amount of water is not critical. Typically it is between about 50% to 90%, more typically between about 65% to 80% by weight of the emulsion. An effective amount of a cationic surfactant is added before or during polymerization. Typically this is between about 0.25% and 5% by weight of the water-free monomer mixture. Preferably it is between about 0.5% and 1.5%. Alternatively, the cationic surfactant is mixed with water and then combined with monomers (a), (b), and (c), individually or as a monomer mixture. After polymerization an anionic surfactant is added in an amount to provide an emulsion with a zeta potential of between +15 and +30 millivolts. Preferably the zeta potential is between +15 to +25 millivolts. More preferably the zeta potential is between +20 and +25 millivolts. Still more preferably the zeta potential is between +15 and +28 millivolts. The amount of the second surfactant added to adjust the zeta potential to +15 to +30 is from about 0.1% to 1% by weight of the water-free monomer mixture. For every one gram of the initial first surfactant used, the second surfactant is added at from about 1% to 100% by weight based on the first surfactant, preferably at from about 60% to 70% by weight based on the first surfactant, and more preferably at about 65%. Typically, this more preferable zeta potential is achieved when the ratio of the first surfactant added to the second surfactant added is about 0.65:1.0 on an ionic molar equivalent basis.

Optionally, a nonionic surfactant is used with either the first or second surfactant. Typically the nonionic surfactant is added at from about 0% to about 10% by weight on a water free basis. Preferably it is present at from about 2% to about 5% by weight of the water-free monomer mixture.

In another embodiment of this invention, the above composition comprising (a), (b) and (c) is emulsified in water using an anionic surfactant (first surfactant) in an amount of from about 0.25% to about 5% by weight on a water free basis before polymerization, and a cationic surfactant (second surfactant) is added after polymerization in the amount noted above to provide an emulsion with the zeta potential described above. Optionally, a nonionic surfactant is used with either surfactant in an amount as described above.

In still another embodiment, this invention provides an aqueous emulsion of an oil- and water-repellent composition comprising by weight (water-free basis):

(a) from about 50% to about 85% polymer chain units derived from a mixture of perfluoroalkylethyl acrylate monomers (a) as described previously;

(b) from about 1% to about 9.9% polymer chain units derived from vinylidene chloride; and, (c) from about 10% to about 25% polymer chain units derived from an alkyl (meth)acrylate having an alkyl chain length of 2 to 18 carbons;

(d) a cationic surfactant and, (e) an anionic surfactant, wherein the amounts of (d) and (e) are sufficient to provide an emulsion with the zeta potential of +15 to +30 millivolts. Optionally a nonionic surfactant is used with either surfactant. Typically the amounts for the cationic, anionic and nonionic surfactants are as described above for the process of the present invention.

One or more specialized monomers optionally are incorporated into the copolymers of the present invention in lesser amounts, e.g., 0–5% by weight, to impart improved cross-linking, latex stability and substantivity. These materials include 0–5% by weight of one or more poly (oxyethylene) (meth)acrylates such as polyethylene glycol methacrylate, 0–2% by weight of N-methylol acrylamide or methacrylamide, 0–2% by weight of hydroxyethyl (meth) acrylate, 0–2% by weight of 2-hydroxybutyl (meth)acrylate, 0–2% by weight of 2-hydroxypropyl meth)acrylate, 0–2% by weight of 3-chloro-2-hydroxypropyl (meth)acrylate, or 0–2% by weight of glycidyl (meth)acrylate.

The zeta potential is a measure of charge on the emulsified particles. It can be measured using a Zeta-Meter 3.0 Unit available from Zeta-Meter Inc., New York, N.Y. In using it, the emulsion samples are diluted to approximately 3% concentration with deionized water. An average of 25 individual readings, corrected for temperature, are reported as the sample's zeta potential. Since the zeta potential is somewhat difficult to measure, reported results may vary by 1 or 2 millivolts. We have found it most convenient to control the zeta potential by controlling the relative ratio of cationic and anionic surfactant, rather than try to control it directly. In fact, by use of this control method, we have found it possible to make emulsions with a zeta potential of about zero, which others in the field have found it difficult or impossible to make.

High anionic or high alkalinity conditions occur often in standard processes employed in application of fluorochemical copolymers to fabrics. For example, many dyes and dyeing auxiliary agents are highly anionic in nature. Furthermore, some fabrics, particularly cotton fabrics, are often treated with caustic solutions in their processing. When some of the caustic remains on the fabric and that fabric is subsequently treated with a fluoropolymer oil and water repellent, decomposition of the polymer is common. Examples of the current invention have excellent stability in the presence of alkali and dye agents.

High shear conditions exist when, for example, a polymer of the invention is pumped, agitated, or applied to a fabric in a size press or squeeze roller apparatus well known in the art. Polymers described by the prior art tend to precipitate or deposit sticky polymeric residues on the shear surfaces of such equipment. Stabilized polymers described in the current invention do not precipitate or deposit sticky polymeric residues as easily as polymers described in the prior art.

The cationic, anionic and nonionic surfactants used in this invention are any of those surfactants commonly used for preparing aqueous emulsions. Suitable cationic agents include, for example, dodecyltrimethylammonium acetate, trimethyltetradecylammonium chloride, hexadecyltrimethylammonium bromide, trimethyloctadecylammonium chloride, ethoxylated alkyl amine salts, and others. A preferred example of a suitable cationic surfactant is the methyl chloride salt of an ethoxylated alkyl amine salt such as an 18-carbon alkylamine with 15 moles of ethylene oxide such as ETHOQUAD 18/25 available from Akzo Nobel, Chicago, Ill. Nonionic surfactants which are suitable for use herein include condensation products of ethylene oxide with 12–18 carbon atom fatty alcohols, 12–18 carbon fatty acids, alkyl phenols having 8–18 carbon atoms in the alkyl group, 12–18 carbon atom alkyl thiols and 12–18 carbon atom alkyl amines. A preferred example of a suitable nonionic surfactant, if used in combination with the cationic surfactant, is an ethoxylated tridecyl alcohol surfactant such as MERPOL SE available from Stepan Company, Northfield, Ill. Suitable anionic surfactants which are used herein include alkyl carboxylic acids and their salts, alkyl hydrogen sulfates and their salts, alkyl sulfonic acids and their salts, alkyl ethoxy sulfates and their salts, alpha olefin sulfonates, alkylamidoalkylene sulfonates, and the like. Generally preferred are those wherein the alkyl groups have 8–18 carbon atoms. Especially preferred is an alkyl sulfate sodium salt such as sodium lauryl sulfate, i.e., where the alkyl group averages about 12 carbons, such as Duponol WAQE available from Witco Corporation, Greenwich, Conn.

In addition to the above ingredients and water, the final composition optionally contains up to about 10% by weight, preferably between 5% and 10% by weight, of auxiliary solvents such as dipropylene glycol, hexylene glycol, proylene glycol, ethylene glycol, acetone and others.

Emulsion polymerization is employed in the processes of this invention to prepare the copolymers of this invention. The process is carried out in a reaction vessel fitted with a stirrer and external means for either heating or cooling the charge. The monomers to be polymerized together are emulsified in an aqueous solution containing a suitable surfactant, and optionally an organic solvent, to provide an emulsion concentration of 5% to 50% by weight. Usually the temperature is raised to about 40° C. to 70° C. to effect polymerization in the presence of an added catalyst. A suitable catalyst is any of the commonly known agents for initiating the polymerization of an ethylenically unsaturated compound. Such commonly employed initiators include 2,2'-azodi-isobutyramidine dihydrochloride; 2,2'- azodiisobutyro-nitrile; and 2,2' azobis(2,4-dimethyl-4-methoxyvaleronitrile. The concentration of added initiator is usually 0.1–2%, based on the weight of the monomers to be polymerized. To control molecular weight of the resulting polymer, small amounts of a chain-transfer agent, such as an alkylthiol of 4–18 carbon atoms, is optionally present during polymerization.

After polymerization either an anionic or cationic surfactant is added to the emulsion. If an anionic surfactant is used during polymerization, a cationic surfactant is added after polymerization. If a cationic surfactant is used during polymerization, an anionic surfactant is added after polymerization. Both an anionic and cationic surfactant are present in the emulsions of the present invention in order to achieve the zeta potential desired for a particular application, and to have the desired chemical and mechanical stability under conditions of high alkalinity, high anionic concentration, or high shear during use of the emulsion.

The aqueous emulsion of this invention is applied directly to a textile or substrate to be rendered oil- and water-repellent. The emulsion of this invention is applied alone or in admixture with dilute nonfluorinated polymers, or with other textile treatment agents or finishes.

The emulsions of this invention are generally applied to textile fabrics by spraying, dipping, padding, or other well-known methods. After excess liquid has been removed, for example by squeeze rolls, the treated fabric is dried and then cured by heating, for example, to 110° C. to 190° C., for at least 30 seconds, typically 60–180 seconds. Such curing enhances repellency and durability. While these curing conditions are typical, some commercial apparatus may operate outside these ranges because of its specific design features. The emulsions of this invention are useful in rendering the textile, fiber, or substrate surface repellent to oil and water. The emulsions of the present invention are advantageous in that they can be used under a wide variety of application conditions due to their stability.

The following testing procedures are used in the Examples.
Stability Test Procedure: Alkali Test Distilled water (100 g) was combined with NaOH (48% aqueous solution, 1.0 g) in a clear glass bottle. The test copolymer emulsion (3.0 g) was added with vigorous stirring to this bath followed immediately by a solution of VIBATEX EPL (10.0 g) a polyvinyl alcohol resin available from Pfersee Chemie, Langweid, Germany in water (40.0 g). Observations were made periodically over the next 6 hours for cloudiness, color change or precipitation. Any such change in the solution was noted as a failure.

The alkali stability of the product from Example 1 was satisfactory. The test solution remained clear for more than 24 hours. Commercial repellency fluorochemical compositions such as ASAHIGARD AG-710 and OLEOPHOBOL SD failed in this alkali stability test as follows: After approximately 10 minutes, the alkali test solution changed from clear to turbid. After approximately 1 hour, noticeable precipitation occurred. After approximately 2 hours, noticeable darkening and additional precipitation occurred.
Fabric Treatment A NYLON SUPPLEX (grape color) cloth was treated with the above product as follows. A mixture was made of 3.0 gm of the above emulsion, 196.6 gm of deionized water, and 0.4 gm of ALKANOL 6112, a wetting agent available from E. I. du Pont de Nemours, and Company, Wilmington, Del. This uses equivalent to 1.5% of the above emulsion in the bath and delivered 900 ppm fluorine to the fabric at 67% wet pickup. It was applied to the nylon fabric in a size press with roller pressure of 30 psi ($2.07 \times 10^5$ Pa). The fabric was dried at 350° F. (177° C.) for 1 minute. After applying to the nylon fabric, the following tests on the fabric were used to evaluate the resulting emulsions.
Water Repellency The treated fabric sample was tested for water repellency using AATCC standard Test Method No. 22 of the American Association of Textile Chemists and Colorists. In this test, 250 mL of water at 27° C. was poured on a fabric sample stretched on a 6-inch (15.2 cm) diameter metal hoop. The water is discharged from a funnel suspended 6 inches (15.2 cm) above the fabric sample. After removal of excess water, the fabric was visually scored by reference to published standards. A rating of 100 denoted no water penetration or surface adhesion; a rating of 90 denoted slight random sticking or wetting; lower values denote greater wetting.
Oil Repellency The treated fabric samples were tested for oil repellency by a modification of AATCC standard Test Method No. 118, conducted as follows. A fabric sample, treated with an aqueous dispersion of polymer as previously described, was conditioned for a minimum of 2 hours at 23±2° C. and 65±10% relative humidity. A series of organic liquids, identified below in Table I, were then applied dropwise to the fabric samples. Beginning with the lowest numbered test liquid, (Repellency Rating No. 1) one drop (approximately 5 mm in diameter or 0.05 mL volume) was placed on each of three locations at least 5 mm apart. The drops were observed for 30 seconds. If, at the end of this period, two of the three drops were still spherical in shape with no wicking around the drops, three drops of the next highest numbered liquid were placed on adjacent sites and similarly observed for 30 seconds. The procedure was continued until one of the test liquids resulted in two of the three drops failing to remain spherical to hemispherical, or wetting or wicking occurred.

The oil repellency rating of the fabric was the highest numbered test liquid for which two of the three drops remained spherical to hemispherical, with no wicking for 30 seconds. In general, treated fabrics with a rating of 5 or more are considered good to excellent; fabrics having a rating of one or greater can be used in certain applications.

TABLE I

| | Oil Repellency Test Liquids |
|---|---|
| Oil Repellency Rating Number | Test Solution |
| 1 | NUJOL Purified Mineral Oil |
| 2 | 65/35 NUJOL/n-hexadecane by volume at 21° C. |
| 3 | n-hexadecane |
| 4 | n-tetradecane |
| 5 | n-dodecane |
| 6 | n-decane |

Note: Nujol is a trademark of Plough, Inc., for a mineral oil having a Saybolt viscosity of 360/390 at 38° C. and a specific gravity of 0.880/0.900 at 15° C.

The following examples illustrate particular aspects of the present invention. In the examples, all percentages are by weight unless otherwise indicated. Capitalization is used to indicate tradenames throughout.

EXAMPLE 1

This example showed the preparation of a sample with the inventive process and a vinylidene chloride content of 6.1% based on monomer weight. A water emulsion was prepared by mixing the following ingredients: water (170.0 g), tridecyl alcohol 5-ethylene oxide adduct (7.0 g); $C_{18}$ alkyl amine ethoxylate (15 moles of ethylene oxide) (1.0 g); ZONYL T-AN (68.6 g), available from E. I. du Pont de Nemours and Company, Wilmington, Del.; stearyl methacrylate (18.0 g); vinylidene chloride (6.0 g), N-methylol acrylamide (2.0 g); 2-hydroxyethyl methacrylate (1.0 g); dodecyl mercaptan (0.5 g); and dipropylene glycol (30.0 g). ZONYL T-AN has the following formula: $CF_3CF_2(CF_2)_xC_2H_4OC(O)$—C(H) =$CH_2$ wherein x=6, 8, 10, 12, 14, 16 and 18 in the respective relative amounts of about 3%, 50%, 31%, 10%, 3%, 2% and 1%, said monomer having a weight average molecular weight of 569.

After thoroughly mixing, the above emulsion was sonicated for 5 minutes in an Ultrasonics ultrasonic Converter available from Ultrasonics, Farmingdale N.Y. then placed in a 500 mL reactor fitted with an agitator, a thermometer, and a dry-ice condenser. Deoxygenated nitrogen was passed through the solution for 1 hour. Next the following initiator was added: and azobis isobutyramidine hydrochloride (V-50; 0.5 g) available from Wako Chemical, Richmond, Va. in water (10.0 g). The resulting mixture was then heated to 65° C. over 1 hour and held at 65° C. for 8 hours. Following the polymerization phase, a solution of water (90 g) and the anionic surfactant, lauryl sulfate sodium salt, (Duponol WAQE; 0.62 g, available from Witco Corporation, Greenwich, Conn.) was added and stirred for 1 hour. The zeta potential was measured and found to be +28 millivolts. Product stability was tested using the alkali test and passed. Fabric was treated as previously described and tested for water and oil repellency. Water repellency was rated as 100 and oil repellency as 6.

Comparative Example A

This example showed the preparation of a sample similar to the inventive composition of Example 1 except for the omission of the anionic surfactant. A copolymer was prepared with the same composition as in Example 1, but after polymerization the resulting copolymer emulsion was diluted with water (90 g). No anionic surfactant was added after polymerization was completed. The zeta potential was measured and found to be +35 millivolts, outside the desired range.

This product failed to have adequate alkali stability, when tested as for Example 1. This demonstrated that the addition of oppositely-charged surfactant after polymerization was required for stability.

Comparative Example B

This example showed the preparation of a sample similar to the inventive composition except for a vinylidene chloride content of 12% based on monomer weight. Following the procedure shown in Example 1 another copolymer sample was prepared using a composition disclosed in prior art (U.S. Pat. No. 4,742,140) but outside the range of the current invention. In this case the following monomers were polymerized: tridecyl alcohol 5-ethylene oxide adduct (7.0 g); $C_{18}$alkyl amine ethoxylate salt (15 moles of ethylene oxide; 1.0 g); ZONYL T-AN; 68.6 g); stearyl methacrylate (18.0 g); N-methylol acrylamide (2.0 g); 2-hydroxyethyl methacrylate (1.0 g); dodecyl mercaptan (0.5 g); dipropylene glycol (30.0 g); vinylidene chloride (12.0 g); and azobis isobutyramidine hydrochloride (V-50; 0.5 g) in water (10.0 g). Following the polymerization phase (at 65° C. for 8 hours), a solution of water (90 g) and the anionic surfactant, lauryl sulfate sodium salt, (Duponol WAQE; 0.62 g) was added and stirred for 1 hour.

The alkali stability of the product was unsatisfactory. The example illustrated that the presence of greater than 9.9% of a monomer (b) derived from vinylidene chloride was detrimental to performance.

Comparative Example C

Following the general procedure shown in Example 1 yet another copolymer sample was prepared. In this case the following monomers were polymerized: tridecyl alcohol 5-ethylene oxide adduct (7.0 g); $C_{18}$ alkyl amine ethoxylate (15 moles of ethylene oxide; 1.0 g); lauryl sulfate sodium salt (0.62 g); ZONYL T-AN (68.6 g), stearyl methacrylate (18.0 g); N-methylol acrylamide (2.0 g); 2-hydroxyethyl methacrylate (1.0 g); dodecyl mercaptan (0.5 g); dipropylene glycol (30.0 g); vinylidene chloride (6.0 g); and azobis isobutyramidine hydrochloride (V-50; 0.5 g) in water (10.0 g). Following the polymerization phase (at 65° C. for 8 hours), water (90 g) was added and stirred for 1 hour. No cationic surfactant was added after polymerization.

Product stability in the alkali test was unsatisfactory. This example demonstrated the need to add cationic surfactant after polymerization (if anionic surfactant was used during polymerization) to achieve stability.

EXAMPLES 2–3 and Comparative Example D

A fluoropolymer emulsion was prepared according to Example 1. Following the polymerization phase solutions of water and anionic surfactant. (lauryl sulfate sodium salt), were added in weight portions (in grams) according to Table II.

TABLE II

| Example Component | D | 2 | 3 |
|---|---|---|---|
| Copolymer | 200.0 | 200.0 | 200.0 |
| Water | 30.0 | 30.0 | 30.0 |
| Anionic Surfactant added (g) | 0.0 | 0.20 | 0.40 |
| Zeta Potential | +35 | +27 | +25 |
| Alkali Test | Fail | Pass | Pass |

Comparative Example D failed the test. Although the emulsion was within the desired zeta potential range, it did not have the added anionic surfactant, and so was outside the scope of this invention. Examples 2 to 3, with the added anionic surfactant, all passed the stability test.

What is claimed is:
1. A process for preparing an oil- and water-repellent aqueous emulsion composition comprising
  1) forming a mixture with water comprising by weight:
    (a) from about 50% to about 85% by weight on a water free basis of polymer chain units derived from a mixture of perfluoroalkylethyl acrylate monomers of the formula:

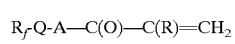

wherein
    $R_f$ is a straight or branched-chain perfluoroalkyl group containing from 2 to 20 carbon atoms,
    R is H or $CH_3$,
    A is O, S, or N(R'),
    Q is alkylene of 1 to 15 carbon atoms, hydroxyalkylene of 3 to 15 carbon atoms, —$(C_nH_{2n})(OC_qH_{2q})$ m-, —$SO_2$—NR'$(C_nH_{2n})$—, or —CONR' $(C_nH_{2n})$—,
    R' is H or alkyl of 1 to 4 carbon atoms, n is 1 to 15, q is 2 to 4, and m is 1 to 15;
(b) from 1% to 8% by weight on a water free basis of monomer chain units derived from vinylidene chloride; and,
(c) from about 10% to about 25% by weight on a water free basis of monomer chain units derived from an alkyl acrylate or alkyl (meth)acrylate having an alkyl chain length of 2 to 18 carbons; and
(d) from about 0.25% to about 5% by weight on a water free basis of a cationic surfactant;

2) polymerizing said mixture, and 3) adding an anionic surfactant in an amount sufficient to yield an emulsion with a zeta potential of between +15 and +30 millivolts, useful for textile application.

2. The process of claim 1 wherein a nonionic surfactant is used with the cationic surfactant.

3. A process for preparing an oil- and water-repellent aqueous emulsion composition comprising 1) forming a mixture with water comprising:
(a) from about 50% to about 85% by weight on a water free basis of polymer chain units derived from a mixture of perfluoroalkylethyl acrylate monomers of the formula:

$$R_f\text{-Q-A}-C(O)-C(R)=CH_2$$

wherein
$R_f$ is a straight or branched-chain perfluoroalkyl group containing from 2 to 20 carbon atoms,
R is H or $CH_3$,
A is O, S, or N(R'),
Q is alkylene of 1 to 15 carbon atoms, hydroxyalkylene of 3 to 15 carbon atoms, $-(C_nH_{2n})(OC_qH_{2q})m-$, $-SO_2-NR'(C_nH_{2n})-$, or $-CONR'(C_nH_{2n})-$,
R' is H or alkyl of 1 to 4 carbon atoms,
n is 1 to 15, q is 2 to 4, and m is 1 to 15;
(b) from 1% to 8% by weight on a water free basis of monomer chain units derived from vinylidene chloride; and,
(c) from about 10% to about 25% by weight on a water free basis of monomer chain units derived from an alkyl acrylate or alkyl (meth)acrylate having an alkyl chain length of 2 to 18 carbons; and
(d) from about 0.25% to about 5% by weight on a water free basis of an anionic surfactant;

2) polymerizing said mixture, and 3) adding a cationic surfactant in an amount sufficient to yield an emulsion with a zeta potential of between +15 and +30 millivolts.

4. The process claim 1, 2 or 3 wherein the perfluoroalkylethyl acrylate monomers (a) are between 60% and 80% of the weight of the monomer mixture.

5. The process of claim 1, 2 or 3 wherein the vinylidene chloride (b) units are between 4% and 8% of the monomer mixture.

6. The process of claim 1, 2 or 3 wherein the perfluoroalkylethyl acrylate monomers have the formula:

$$CF_3CF_2(CF_2)_kC_2H_4OC(O)CH=CH_2,$$

and consists essentially of:
(1) 0–10% monomer wherein k is 4 or less;
(2) 45–75% monomer wherein k is 6;
(3) 20–40% monomer wherein k is 8;
(4) 1–20% monomer wherein k is 10;
(5) 0–5% monomer wherein k is 12.

7. The process of claim 1, 2 or 3 wherein the alkyl (meth)acrylate is stearyl methacrylate.

8. An oil- and water-repellent aqueous emulsion composition comprising by weight:
(a) from about 50% to about 85% by weight on a water free basis of polymer chain units derived from a mixture of perfluoroalkylethyl acrylate monomers of the formula:

$$R_f\text{-Q-A}-C(O)-C(R)=CH_2$$

wherein
$R_f$ is a straight or branched-chain perfluoroalkyl group containing from 2 to 20 carbon atoms,
R is H or $CH_3$,
A is O, S, or N(R'),
Q is alkylene of 1 to 15 carbon atoms, hydroxyalkylene of 3 to 15 carbon atoms, $-(C_nH_{2n})(OC_qH_{2q})m-$, $-SO_2-NR'(C_nH_{2n})-$, or $-CONR'(C_nH_{2n})-$,
R' is H or alkyl of 1 to 4 carbon atoms,
n is 1 to 15, q is 2 to 4, and m is 1 to 15;
(b) from 1% to 8% by weight on a water free basis of polymer chain units derived from vinylidene chloride;
(c) from about 10% to about 25% by weight on a water free basis of polymer chain units derived from an alkyl acrylate or alkyl (meth)acrylate having an alkyl chain length of 2 to 18 carbons;
(d) a cationic surfactant and,
(e) an anionic surfactant,
said emulsion composition having a zeta potential of between +15 and +30 millivolts, and useful for textile application.

9. The composition of claim 8 wherein the perfluoroalkylethyl acrylate monomers (a) are between 60% and 80% by weight.

10. The composition of claim 8 wherein the vinylidene chloride (b) units are between 4% and 8% by weight.

11. The composition of claim 8 wherein the perfluoroalkylethyl acrylate monomers have the formula:

$$CF_3CF_2(CF_2)_kC_2H_4OC(O)CH=CH_2,$$

and consists essentially of:
(1) 0–10% monomer wherein k is 4 or less;
(2) 45–75% monomer wherein k is 6;
(3) 20–40% monomer wherein k is 8;
(4) 1–20% monomer wherein k is 10;
(5) 0–5% monomer wherein k is 12.

12. The composition of claim 8 wherein the alkyl (meth) acrylate is stearyl methacrylate.

* * * * *